Aug. 7, 1923.

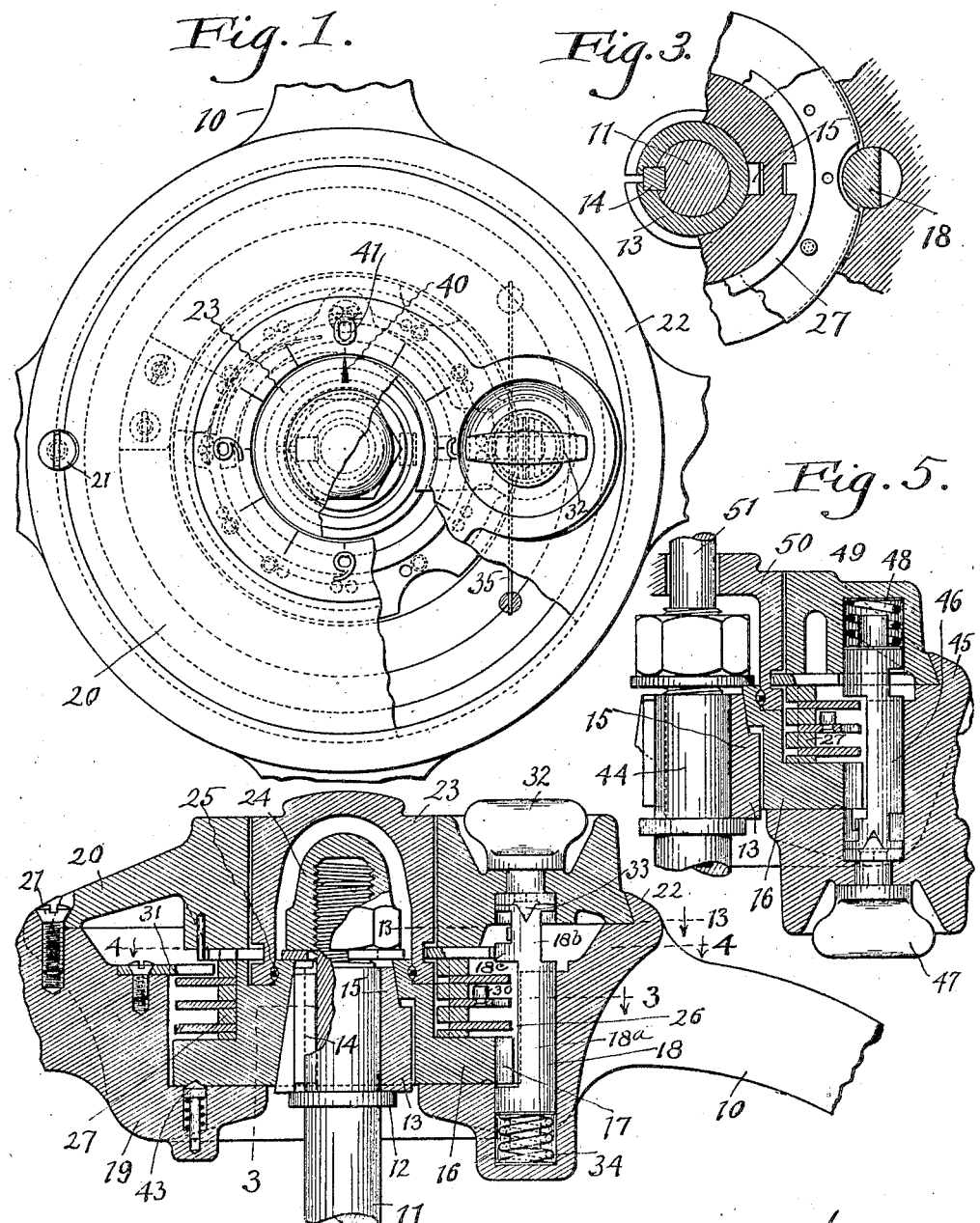

W. G. FORDING

STEERING WHEEL LOCK FOR MOTOR VEHICLES

Original Filed June 9, 1921   3 Sheets-Sheet 2

1,464,175

Inventor
William G. Fording
by
Thurston Kwis & Hudson
attys.

Aug. 7, 1923.
W. G. FORDING
STEERING WHEEL LOCK FOR MOTOR VEHICLES
Original Filed June 9, 1921   3 Sheets-Sheet 3
1,464,175
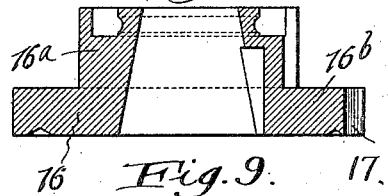
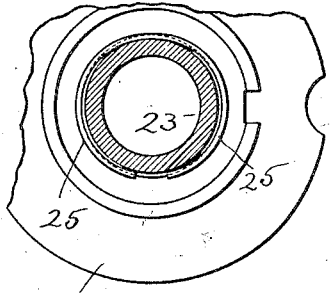
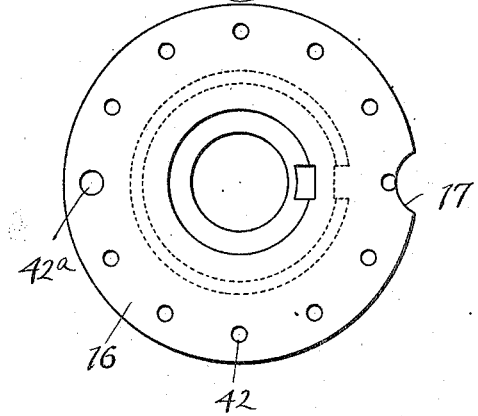
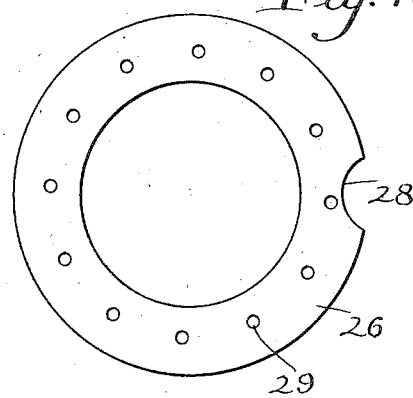
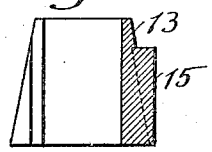
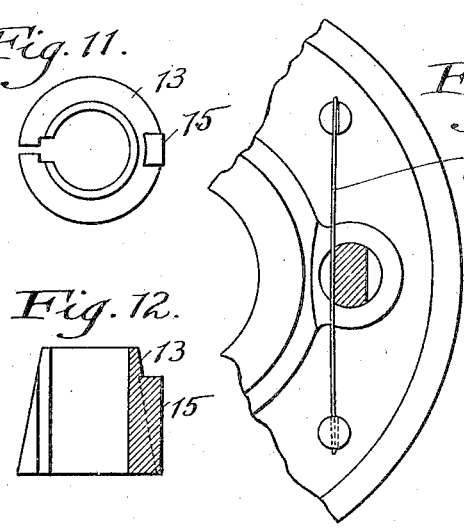
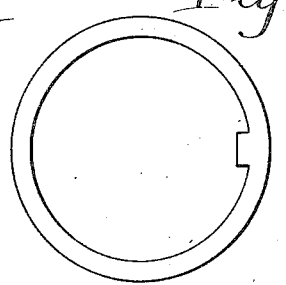
Inventor
William G. Fording
by
Thurston Kwait Hudson
attys Patented Aug. 7, 1923.

1,464,175

UNITED STATES PATENT OFFICE.

WILLIAM G. FORDING, OF CLEVELAND, OHIO.

STEERING-WHEEL LOCK FOR MOTOR VEHICLES.

Application filed June 9, 1921, Serial No. 476,143. Renewed January 10, 1923.

*To all whom it may concern:*

Be it known that I, WILLIAM G. FORDING, a citizen of the United States, residing at Cleveland, in the county of Cuyahoga and State of Ohio, have invented a certain new and useful Improvement in Steering-Wheel Locks for Motor Vehicles, of which the following is a full, clear, and exact description.

This invention relates to an improved steering wheel lock for motor vehicles, and has for its chief object to provide a steering wheel with an improved combination lock by which the wheel may be locked to the steering post, and by a simple expedient unlocked therefrom so that it cannot again be restored to driving or turning relationship with the post until after a certain predetermined combination of movements is effected.

A further object is to provide an effective combination lock with the parts compactly arranged, and with the parts so designed and constructed that the lock embodies features of durability and certainty, as well as affording the maximum degree of security against theft.

Still further the invention aims to so construct the device that maximum protection is afforded against removal of the wheel from the post by an unauthorized person, or of circumventing the lock by causing driving engagement between the wheel and the post in some other than the intended manner, or by means of some improvised tool. In other words, it is one of the objects to provide a maximum degree of safety.

The invention may be briefly summarized as consisting in certain novel details of construction, and combinations and arrangements of parts which will be described in the specification and pointed out in the appended claims.

Figure 4:
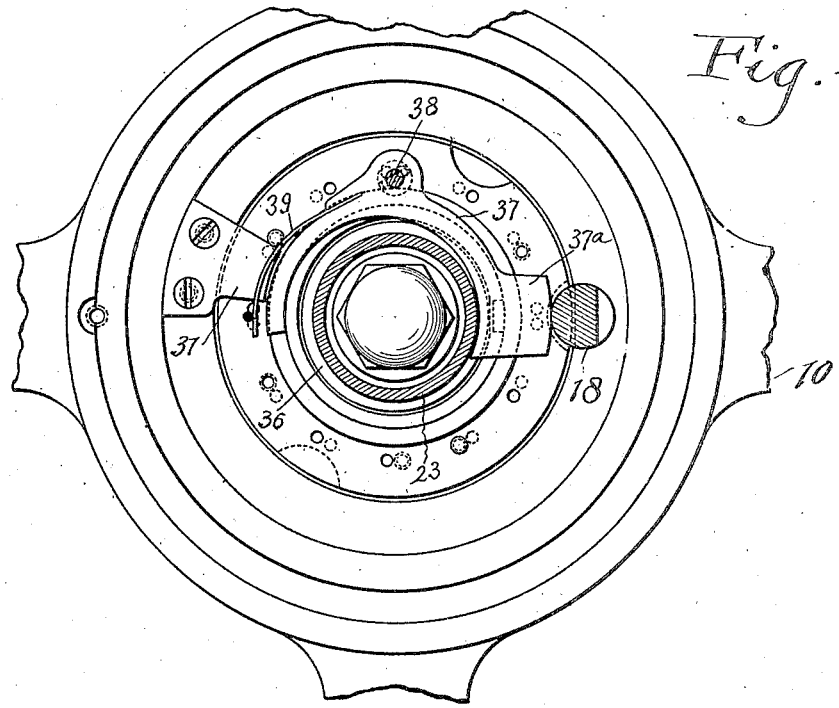
Figure 6:
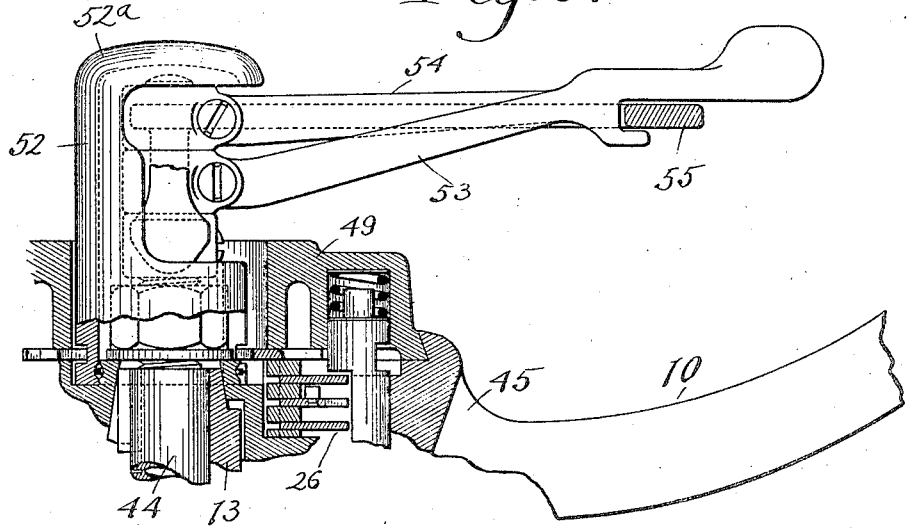

In the accompanying sheets of drawings, Fig. 1 is a top plan view of the central part of the steering wheel embodying my invention; Fig. 2 is a transverse sectional view of the same; Fig. 3 is a fragmentary sectional view, the section being taken substantially along the line 3—3 of Fig. 2, with the locking bolt in locked or driving position; Fig. 4 is a sectional view substantially along the line 4—4 of Fig. 2; Fig. 5 is a partial or fragmentary sectional view similar to Fig. 2, but showing a modification, the construction in Fig. 5 being preferred for motor vehicles wherein the spark and throttle control levers are above the steering wheel, whereas the construction shown in Figs. 1 to 4 is preferred wherein these control levers are beneath the steering wheel; Fig. 6 is a sectional view partly in elevation with the section corresponding to Fig. 5 and showing substantially the construction of Fig. 5, but with an additional safety feature; Figs. 7, 8 and 9 are detail views of an inner locking member to which the steering wheel is adapted to be locked for normal operation, Fig. 7 being a sectional view, Fig. 8 a top plan view, and Fig. 9 a bottom view; Fig. 10 is a plan view of one of several combination disks which are employed in the combination lock; Figs. 11 and 12 are respectively a top plan and a sectional view of a split tapered bushing which is provided to adapt the device for different makes of vehicles; Fig. 13 is a view partly in elevation and partly in horizontal section along the line 13—13 of Fig. 2; Fig. 14 is a plan view of one of several rings or washers utilized in the construction; and Fig. 15 is an edge view of the combination disks, any number of which may be utilized in the device, a portion of the upper disk being broken away and shown in section.

Referring now to the drawings, and first to Figs. 1 to 4, 10 represents the steering wheel, which may be of any suitable design, which wheel through the interposition of the parts constituting the present invention is adapted to turn a steering post 11. Seated on a flange 12 of the post is a split tapered bushing 13, a detail of which is shown in Figs. 11 and 12, this bushing having a cylindrical bore which fits onto the post and rotates therewith through the medium of a key 14. This bushing is tapered externally, and is provided at one point with a straight or rectangular lug 15, by which driving engagement is made with a locking plate 16 having a central hub 16ª which fits onto the tapered bushing, and having an outstanding base 16ᵇ having at one point in its periphery an arc-shaped notch 17 which is adapted to receive a correspondingly shaped portion of a locking bolt 18, which in this case is carried by the steering wheel, and will be referred to presently. The lower part of the plate 16 forms a bearing for the wheel, the center or hub of the wheel having in effect a cup 19 which receives the member 16 and other parts to be referred to.

At the top of the steering wheel and centrally thereof, is a cover plate 20 which is non-removably attached to the wheel, and in this case it is held or centered by means of a screw 21 (see Figs. 1 and 2), and the outer marginal part of the center part of the wheel is rolled or peened over the lower part of the plate as shown at 22 at the right hand side of Fig. 2. At the center of the cover plate is an opening which receives a central cap 23, which normally covers a nut 24, screwed onto the upper end of the steering post and normally holding the wheel in place thereon. Between the lower part of the cap 23 and the upper part of the hub of member 16, a holding wire 25 is provided to normally retain the cap in place. However, it is one of the features of the invention that when the steering wheel is unlocked from the post, removal of the cap 23 is prevented, and that the cap 23 can be lifted from the cover plate so as to expose the nut 24 only when driving or turning relationship has been restored between the wheel and the post. This will be referred to presently.

Above the base of the member 16 I provide a plurality of so-called combination disks 26, any number of which may be provided, the number depending upon the desired number of combination movements or figures of the combination to lock the wheel to the post after the wheel has been unlocked. These combination disks surround the hub of plate 16, and they are held in spaced relation by rings or washers 27, one shown in detail in Fig. 14, each having an inturned lug fitting into a key-way slot of the hub of plate 16, as clearly shown in Fig. 3. Each of these combination disks is provided on its periphery with an arc-shaped notch 28 (see Fig. 10) which notch is preferably of a curvature somewhat greater than the curved notch 17 of the member 16, as is apparent by a comparison of the notches shown in Figs. 9 and 10. Each of these combination disks is provided with a series of uniformly spaced openings 29 adapted to receive aligning pins 30 (see particularly Fig. 15) the spacing or location of which determines the combination of the lock. With three disks as here shown, each having twelve openings, it is possible to provide in excess of three thousand combinations.

By referring to Fig. 15 it will be observed that the upper and middle combination disks 26, are each provided with two upstanding pins 30 and one downwardly extending pin 30, and that the lower-most disk has simply one upwardly extending pin 30. The axial spacing of these disks through the medium of the spacers or rings 27 is such that the pins of the adjacent disks will engage one another so that one may drive or turn the other.

Carried by the head or central portion of the steering wheel outside of the combination disks 26 and above the uppermost disks is a plate 31, with a portion extending inwardly into the plane or path of movement of the pins extending up from the uppermost disk (see particularly Fig. 4). Obviously this plate will engage one of the pins of the uppermost disk and then rotate the uppermost disk when the wheel is unlocked and when it is turned relative to the post. It might be here stated that it is not essential that the uppermost disk 26 have two of the upstanding pins 30, although that arrangement is preferred as it reduces the lost motion of the wheel in setting or working the combination.

Referring now to the locking bolt 18 which was previously mentioned, it will be observed that this locking bolt is seated in a cylindrical socket on the hub of the wheel adjacent the periphery of the member 16 and of the combination disks above it. It is a feature of this invention that this locking bolt and the turn button or other member 32 by which the bolt may be turned, are separate pieces. In this instance, the turn button 32 is rotatably supported by the cover 20, and the base of the button has a tapered portion 33 which fits into a V-shaped notch at the top of the bolt. At the base of the bolt, i.e. between the bottom of the bolt and the base of the cylindrical socket of the wheel which receives the bolt, is a spring 34, the arrangement being such that if too much pressure or force is applied to the turn button to turn the bolt, the bolt will yield downwardly permitting the free turning of the turn button, this taking place if an attempt should be made to rotate the bolt before the member 16 and combination disks are in position to permit the bolt to be turned to the locking position.

The bolt 18 has a substantially semi-cylindrical body portion 18$^a$, the radius of curvature of which corresponds to the radius of curvature of the notch 17 of member 16, and this semi-cylindrical portion is adapted to be received in the notch 17 of plate 16 and notches 28 of the combination disks 26 when the parts have been properly aligned, and when the bolt is thus positioned, it constitutes a key or lock by which driving engagement is established between the wheel and the plate 16, and therefore the post. On the other hand, when the bolt is turned 180° from its locking position, in other words, when turned to the position shown in Fig. 2, the semi-cylindrical body portion 18$^a$ of the bolt is removed from the notches 17 and 28, permitting the wheel to be turned freely. Near the top of the bolt there is a reduced portion 18$^b$ having two opposite flat faces adapted to be engaged by a flat spring 35 to hold the bolt in locking and unlocking position in the well-known manner.

As already stated, it is desirable that the removal of the cap 23 be prevented when the wheel is unlocked and that it be capable of ready removal when the wheel is connected to the post. To accomplish these results the cap 23 is provided near its lower end with an annular or peripheral groove 36, and movable in the plane of this groove is a locking latch 37, (see particularly Fig. 4) which is pivoted by means of a pin 38 to the under side of the cover 20. This latch has an extension 37$^a$ projecting toward the locking bolt 18, and the latter is provided just above the body portion 18$^a$ with an arc-shaped lug 18$^c$, so disposed that when the locking bolt is in unlocking position, this lug of the bolt with a camming action pushes a portion of the latch 37 in this groove 36, and inasmuch as the latch is confined between the lower face of the cover and the uppermost washer or ring 27, it effectively prevents removal of the cap 23 until all parts of the latch are removed from the groove of the cap. This is rendered possible by the fact that when the bolt is moved to locking position, the lug 18$^c$ which is on one side only of the bolt is moved out of engagement with, and away from the latch, and when this takes place the latch is moved to releasing position by a spring 39.

It will be observed by reference to Fig. 1, that the cap 23 is provided with an indicating point 40, and that the adjacent surrounding part of the cover is provided with graduations, part or all of which may be provided with numerals 41, so that back and forth movements of predetermined amounts can be given to the wheel. Likewise, it will be observed from Figs. 2 and 9, that the lower side of the plate 16 is provided with equally spaced openings 42, one of which, 42$^a$ is somewhat larger and deeper than the remainder, this being clearly shown in Fig. 9. These openings are adapted to be engaged by the upper pointed end of a positioning plunger 43 which snaps successively into the different openings of the plate 16 when the wheel is rotated. The relatively deep notch corresponds to the zero position of the wheel, and this is provided in order that the operator will have a means of determining the zero position in the dark, so that it will be possible for him to move the wheel back and forth, and therefore work the combination to lock the wheel.

This device is worked in the following manner: If the operator wishes to loosen the wheel from the post on leaving the car, he will turn the locking bolt to unlocking position, and then give the wheel a turn. To restore the locked condition between the wheel and post it is necessary that he know the combination. In the event there are three combination disks 26, the combination will have three numbers which will depend upon the spacing of the pins 30. Assuming that the pins have been set for a certain combination, which for convenience we will assume to be 3, 6 and 9, the operator will turn the wheel at least a complete revolution to the right, and stop at 3. This properly positions the lowermost disk 26. He will then move the wheel to the left and stop at 6, and then to the right and stop at 9. This positions the other two disks 26. He will then move the wheel to the zero position, and this brings the locking bolt to proper position with reference to the notch of the locking plate 16. The notches of the plate 16 and combination disks are now in alignment, and the operator has simply to turn the locking bolt to locking position, whereupon the wheel is in locked position with respect to the steering post.

As before stated, it is impossible for any one to remove the cap 23 while the wheel is unlocked, and it is impossible with any improvised tool to form a driving engagement between the post and the wheel.

In Fig. 5 I have shown a portion of the combination lock which is of substantially the same construction, and operates in precisely the same manner as that already described, that shown in Fig. 5 being adapted for a wheel having the spark control and throttle levers above it. In this instance the steering post is designated by the reference character 44, and the wheel by the reference character 45, and the only difference between the construction in Fig. 5 and that first described, is that the locking bolt, here designated 46, is reversed in position with respect to its position in the figures first described, the turning button 47 being at the bottom of the locking bolt so that it can be conveniently reached by the operator, and the upper end of the locking bolt engaging the spring here designated 48, and corresponding to the spring 34 of the first construction, which spring is located in a socket on the under side of the cover which is here designated 49. The central cap corresponding to the cap 23 of the first construction, but here designated 50, has a central opening through which the spark and lever control members, one of which is shown at 51, project, and are adapted to receive the spark and throttle control levers in the customary manner. The construction is otherwise similar to that first described, and its operation will be understood without further description.

In Fig. 6 I have shown a construction like that illustrated in Fig. 5, i. e. adapted for a wheel having the throttle and spark control levers above it, the only difference between the constructions shown in Figs. 5 and 6 being that in Fig. 6 the cap here designated 52, projects upwardly and is provided at its upper end with a cover 52ᵃ overlying the upper ends of the shafts to which the throttle and spark control levers here shown at 53 and 54 are attached, these levers co-operating with a segment shown in section at 55, and both levers projecting outwardly from the open side of the cap so that they may be operated through the usual range. The provision of the cover 52ᵃ of the cap 52 prevents the removal of the throttle and spark control levers unless the cap 52 is removed it being understood that the cap 52 is not removable unless the wheel is locked to the steering post through the locking bolt 46 as already fully described. The construction in Fig. 6 is otherwise the same as in Fig. 5, and the corresponding parts of Fig. 5 have similar reference characters.

It will therefore be seen that my invention is equally well adapted for steering wheels having a spark and throttle control levers either above or below the wheel. Furthermore, the invention can be applied to practically all standard makes of cars by properly selecting the size of the tapered split bushing 13.

In conclusion I wish to call attention to the fact that the split tapered bushing 13 not only adapts my improved combination lock to various makes of automobiles, since it is only necessary for me to provide a tapered bushing of a size to fit any particular size of post, but additionally this split tapered bushing provides the necessary means to compensate for, or take up wear which may occur between the relatively movable parts. It is to be noted also, that the base or flange 16ᵇ of the locking plate 16 is somewhat larger in diameter than the diameter of the combination disks 26. This is an important feature of construction, for should an attempt be made to turn the locking bolt before the combination disks are in proper position for locking, the bolt will engage the periphery of the base of the locking plate 16, and will not engage the combination disks, and therefore can not move them.

While I have shown the preferred constructions, I do not desire to be confined to the precise details shown, but aim in my claims to cover all modifications which do not involve a departure from the spirit and scope of the invention as defined in any of the following claims.

Having described my invention, I claim:

1. In combination with a steering post and steering wheel of a vehicle, a combination lock adapted to release the wheel from the post and to lock the same to the post after the wheel has been given a series of predetermined movements, said lock comprising a series of combination disks surrounding the post adapted to be successively positioned by said predetermined movements of the wheel, and two locking or driving members, one carried by the wheel and the other carried by the post, and comprising a member with a notch and a rotary locking bolt adapted to be turned into and out of the notch and capable of being turned into the notch only when the combination disks have been properly positioned.

2. In combination with a steering post and steering wheel of a vehicle, a combination lock adapted to release the wheel from the post and to lock the same to the post after the wheel has been given a series of predetermined movements, said lock comprising a series of notched combination disks surrounding the post and adapted to be successively positioned by said predetermined movements of the wheel so as to align the notches thereof, and two locking or driving members including a notched member adapted to have its notch aligned with the aligned notches of the disks, and a rotary bolt adapted to be turned into the notches of the disks and notched member.

3. In combination with a steering post and steering wheel of a vehicle, a combination lock adapted to release the wheel from the post and to lock the same to the post after the wheel has been given a series of predetermined movements, said lock comprising a series of notched combination disks surrounding the post and adapted to be successively positioned by said predetermined movements of the wheel so as to align the notches thereof, and two locking or driving members including a notched member adapted to have its notch aligned with the aligned notches of the disks, and a rotary bolt adapted to be turned into the notches of the disks and notched member, the notched member being carried by the post and the bolt by the wheel.

4. In combination with a steering post and steering wheel of a vehicle, a combination lock adapted to release the wheel from the post and to lock the same to the post after the wheel has been given a series of predetermined movements, said lock comprising a series of notched combination disks surrounding the post and adapted to be successively positioned by said predetermined movements of the wheel so as to align the notches thereof, and two locking or driving members including a notched member adapted to have its notch aligned with the aligned notches of the disks, and a rotary bolt adapted to be turned into the notches of the disks and notched member, the bolt having its axis substantially parallel to the axis of the post.

5. In combination with a steering post and steering wheel of a vehicle, a combination lock adapted to release the wheel from the post and to lock the same to the post after the wheel has been given a series of predetermined movements, said lock comprising a series of notched combination disks surrounding the post and adapted to be successively positioned by said predetermined movements of the wheel so as to align the notches thereof, and two locking or driving members including a notched member adapted to have its notch aligned with the aligned notches of the disks, and a rotary bolt adapted to be turned into the notches of the disks and of said notched member, the notched member being carried by the post, the bolt being carried by the wheel and having its axis substantially parallel to the axis of the post.

6. In combination with a steering post and and a steering wheel of a vehicle, a combination lock adapted to release the wheel from the post and to lock the same to the post after the wheel has been given a series of predetermined movements, said lock comprising a series of notched combination disks surrounding the post and adapted to be successively positioned by said predetermined movements of the wheel so as to align the notches thereof, and two locking or driving members including a notched annular member adapted to have its notch aligned with the aligned notches of the disks, and a rotary bolt adapted to be turned into the notches of the disks and notched member, the notched driving member having a greater diameter than the disks.

7. In combination with a steering post and steering wheel, a combination lock for connecting the wheel to the post and comprising a split tapered bushing on the post, a driving member carried by the post and fitted on said bushing, and a driving and locking member whose axis is parallel to the axis of the post carried by the wheel and adapted to be interlocked with said driving member on the bushing.

8. In combination with a steering post and steering wheel of a vehicle, a combination lock for connecting the two, and comprising a locking bolt carried by one part and adapted to interlock with an element of the other part after the wheel has been given a combination of movements, said bolt composed of members which may yield relatively on the application of predetermined force and including a locking portion and an actuating portion which engages the former and serves to shift the same into and out of locking position.

9. In combination with a steering post and steering wheel of a vehicle, a combination lock for connecting the two, and comprising a locking bolt carried by one part and adapted to interlock with an element of the other part after the wheel has been given a combination of movements, said bolt being rotatively mounted, and comprising a body portion adapted to be turned to move the same into and out of locking position and an exposed turning button which normally turns said body portion and which may turn relative to the body portion on the application of predetermined turning force.

10. In combination with a steering post and steering wheel of a vehicle, a combination lock adapted to release the wheel from the post and to lock the same to the post after the wheel has been given a series of predetermined movements, said lock comprising a series of notched combination disks surrounding the post and adapted to be successively positioned by said predetermined movements of the wheel so as to align the notches thereof, and two locking or driving members including a notched member adapted to have its notch aligned with the aligned notches of the disks, a rotary bolt adapted to be turned into the notches of the disks and notched member, a cap normally covering the end of the post, and means operated by the bolt for locking the cap, so as to prevent its removal when the wheel is unlocked from the post.

In testimony whereof, I hereunto affix my signature.

WILLIAM G. FORDING.